United States Patent
Swanson et al.

(10) Patent No.: US 7,721,080 B2
(45) Date of Patent: May 18, 2010

(54) MANAGEMENT OF OPTION ROM

(75) Inventors: Robert C. Swanson, Olympia, WA (US); Vincent J. Zimmer, Federal Way, WA (US); Larry D. Aaron, Jr., Irmo, SC (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 767 days.

(21) Appl. No.: 11/428,242

(22) Filed: Jun. 30, 2006

(65) Prior Publication Data
US 2008/0005551 A1    Jan. 3, 2008

(51) Int. Cl.
G06F 9/00 (2006.01)
G06F 9/455 (2006.01)

(52) U.S. Cl. .................. 713/2; 713/1; 703/27

(58) Field of Classification Search ........ 713/2
See application file for complete search history.

(56) References Cited

U.S. PATENT DOCUMENTS

| | | | |
|---|---|---|---|
| 4,120,778 A * | 10/1978 | Goudriaan et al. ......... 208/80 |
| 6,718,401 B2 * | 4/2004 | Nalawadi et al. .......... 710/13 |
| 6,907,482 B2 * | 6/2005 | Maciesowicz ............. 710/63 |
| 7,017,035 B2 * | 3/2006 | Nalawadi et al. .......... 713/1 |
| 7,103,529 B2 * | 9/2006 | Zimmer .................... 703/27 |
| 7,178,014 B2 * | 2/2007 | Nalawadi et al. .......... 713/1 |
| 7,426,633 B2 * | 9/2008 | Thompson et al. ......... 713/2 |
| 2006/0242351 A1 * | 10/2006 | Kavian .................... 710/309 |

OTHER PUBLICATIONS

PCI-SIG, "PCI Firmware Specification", Revision 3.0, May 16, 2005, 92 pp.

* cited by examiner

Primary Examiner—Suresh K Suryawanshi
(74) Attorney, Agent, or Firm—Konrad Raynes & Victor LLP; Rabindranath Dutta

(57) ABSTRACT

Provided are a method, system, and article of manufacture, wherein instructions stored in an option ROM are copied to the system memory of a computer, wherein the option ROM corresponds to a device that is coupled to the computer. A virtual machine is generated, wherein the virtual machine executes the instructions copied to the system memory to boot the device before any operating system is loaded.

21 Claims, 7 Drawing Sheets

MANAGEMENT OF OPTION ROM

BACKGROUND

A computer may include a system Basic Input Output System (BIOS), also referred to as Read Only Memory (ROM) BIOS or system BIOS. The system BIOS includes programs that are executed for booting the computer when the computer is first powered on. The system BIOS may be stored in an onboard Programmable Read Only Memory (PROM), Erasable Programmable Read Only Memory (EPROM), flash memory, etc., on the motherboard of the computer. The inclusion of the system BIOS in a computer ensures that the even if the computer loses the contents of the main memory when the computer is powered down, the system BIOS can be used for booting the computer. The system BIOS may include code to control hardware components such as the keyboard, floppy drives, certain hard disk controllers, etc.

An option ROM may comprise firmware included on adapter cards that control bootable devices coupled to a computer. In certain architectures, option ROM may also be stored on the motherboard when a bootable device is included in the motherboard. Firmware located on one or more option ROMs may be called by the system BIOS while booting the computer, and the execution of the firmware on the one or more option ROMs may allow the computer to use the bootable devices corresponding to the one or more option ROMs, prior to the loading of the operating system. For example, an adapter card that controls a bootable device may include firmware that may be used to boot the device once the option ROM is loaded and executed by the ROM BIOS.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

The system BIOS may have access to a limited amount of memory to load option ROMs. The option ROM space for devices may be restricted to a maximum of 128 K bytes for the option ROM to be compatible with certain system BIOS that are found in personal computers.

The system BIOS may be located from memory locations F0000h to FFFFFh in certain personal computer architectures. When certain computer systems boot a device that is connected through an add-on adapter such as a PCI adapter, the system BIOS has to load initial program load (IPL) code. The IPL code is loaded from the option ROM, which is included in the add-on adapter, to a special area of the system memory. The size of this special area is limited by the computer architecture and, no matter how much memory is installed in the computer system, certain computer systems can allocate up to only 128 K bytes for the IPL code. If a first exemplary IPL code corresponding to a first add-on adapter is 64 K bytes and a second exemplary IPL code corresponding to a second add-on adapter is 64 K bytes, then after loading the IPL codes for the first and second adapters found by the system BIOS, no additional space is left in the system memory for other adapters and the system is unable to boot the devices controlled by the other adapters.

Certain embodiments provide a virtual machine manager that generates a plurality of virtual machines to execute in parallel the IPL codes stored in a plurality of option ROMs, where a virtual machine may comprise an operating environment that may simulate certain operations of a computer. In certain embodiments, the execution of the plurality of virtual machines in parallel may be caused by the concurrent execution of a plurality of threads or processes that implement the plurality of virtual machines, where the concurrent execution of the plurality of threads or processes may take place on uniprocessors, multi-core processors, multiprocessors, etc. Execution in parallel refers to the concurrent execution of the plurality of virtual machines on uniprocessors, multi-core processors, multiprocessor or any other suitable processor. The plurality of virtual machines allow more than 128 K bytes to be allocated in the system memory for executing the IPL codes stored in the option ROMs. The plurality of virtual machines allow the booting of a plurality of bootable devices, even when the aggregate size of the option ROMs included in the plurality of bootable devices exceeds 128 K bytes.

Figure 1:
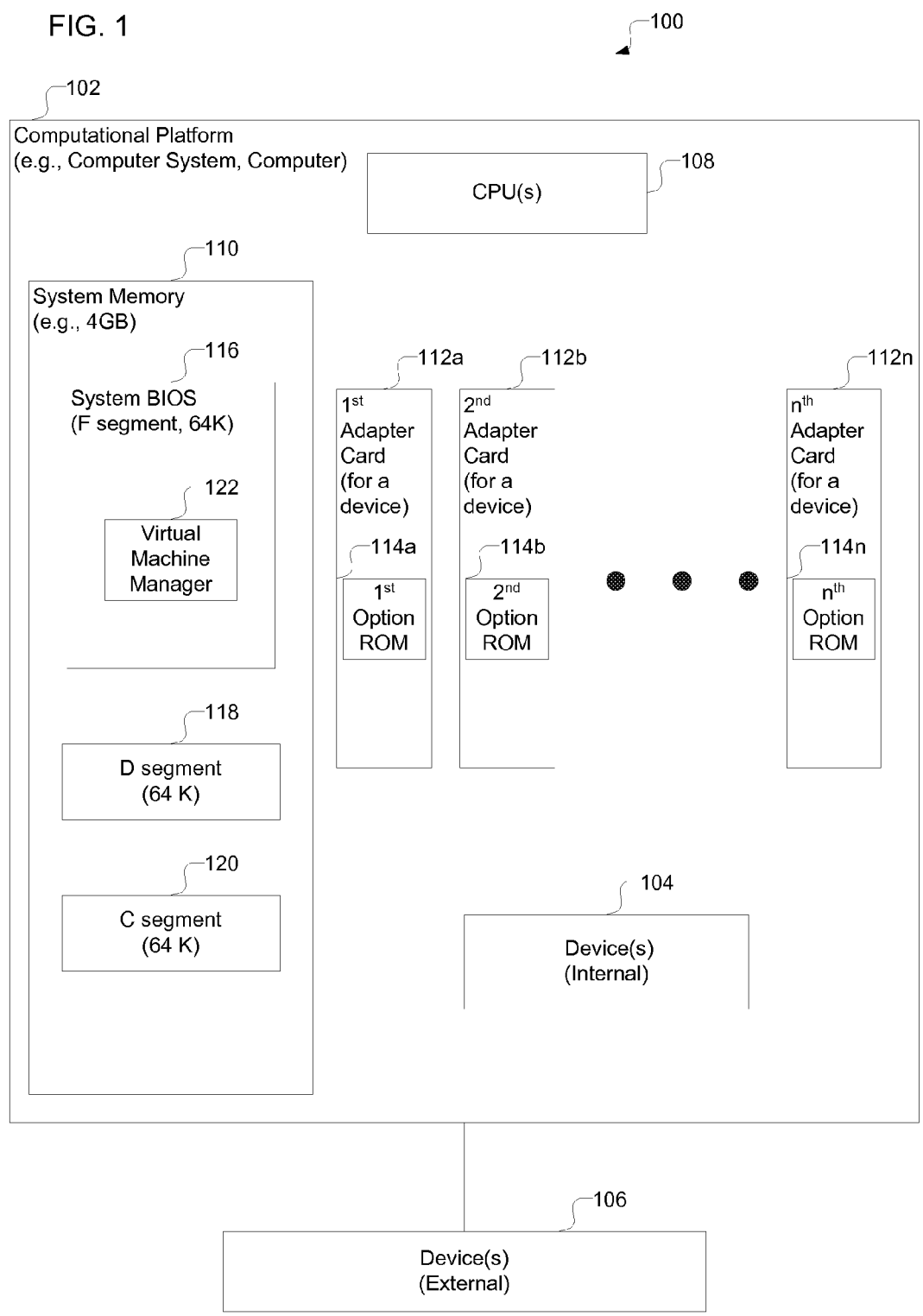
FIG. 1 illustrates a computing environment, in accordance with certain embodiments.

FIG. 1 illustrates a computing environment 100, in accordance with certain embodiments. A computational platform 102 is included in the computing environment 100, where the computational platform 102 may be any suitable device including those presently known in the art, such as, a personal computer, a workstation, a server, a mainframe, a portable computer, a hand held computer, a palm top computer, a telephony device, a network appliance, a blade computer, a storage server, etc.

The computational platform 102 may include one or more internal devices 104 and may be coupled to one or more external devices 106. In certain alternative embodiments, the computational platform 102 may not include any internal devices 104 and in other embodiments the computational platform 102 may not be coupled to any external devices 106. The computational platform 102 may also be coupled to a network (not shown), where the network may comprise the Internet, an intranet, a Local area network (LAN), a Storage area network (SAN), a Wide area network (WAN), a wireless network, etc.

The computational platform 102 includes one or more central processing units (CPU) 108, system memory 110, and a plurality of adapter cards 112a, 112b, . . . 112n. The computational platform 102 may use the plurality of adapter cards 112a . . . 112n to interface with the internal and external devices 104, 106. In certain embodiments, the internal and external devices 104, 106 are bootable devices, such as, internal and external storage devices, and the plurality of adapter cards 112a . . . 112n includes option ROMs 114a, 114b, . . .

114n, where the option ROMs 114a ... 114n may comprise firmware that controls the bootable internal and external devices 104, 106.

In certain embodiments, the system memory 110 may comprise one or more segments. For example, in certain exemplary embodiments in the 32-bit Personal Computer (PC) architecture, the system memory 110 may be up to 4 G bytes in size, where the system BIOS 116 may be stored in the F segment. In addition to the system BIOS 116 that is stored in the F segment, FIG. 1 also illustrates a D segment 118 and a C segment 120, where the C, D, and F segments are each 64 K bytes in size. In certain additional embodiments, additional segments may be present in the system memory 110.

The firmware located in the one or more option ROMs 114a ... 114n may be called by the system BIOS 116 while booting the computational platform 102, and the execution of the firmware on the one or more option ROMs 114a ... 114n may allow the computational platform 102 to use the bootable internal and external devices 104, 106 corresponding to the one or more option ROMs 114a ... 114n, prior to the loading of any operating system (not shown) in the computational platform 102.

In certain embodiments, the system BIOS 116 includes an application, referred to as a virtual machine manager 122, that generates a plurality of virtual machines to map the option ROMs 114a ... 114n. Even if the aggregate size of the C and D segments 118, 120 is inadequate to load all the option ROMs 114a ... 114n, the plurality of virtual machines can be used to execute the option ROMs 114a ... 114n prior to the loading of any operating system in the computational platform 102. The virtual machine manager 122 application may be implemented in software, firmware, hardware or any combination thereof.

Figure 2:
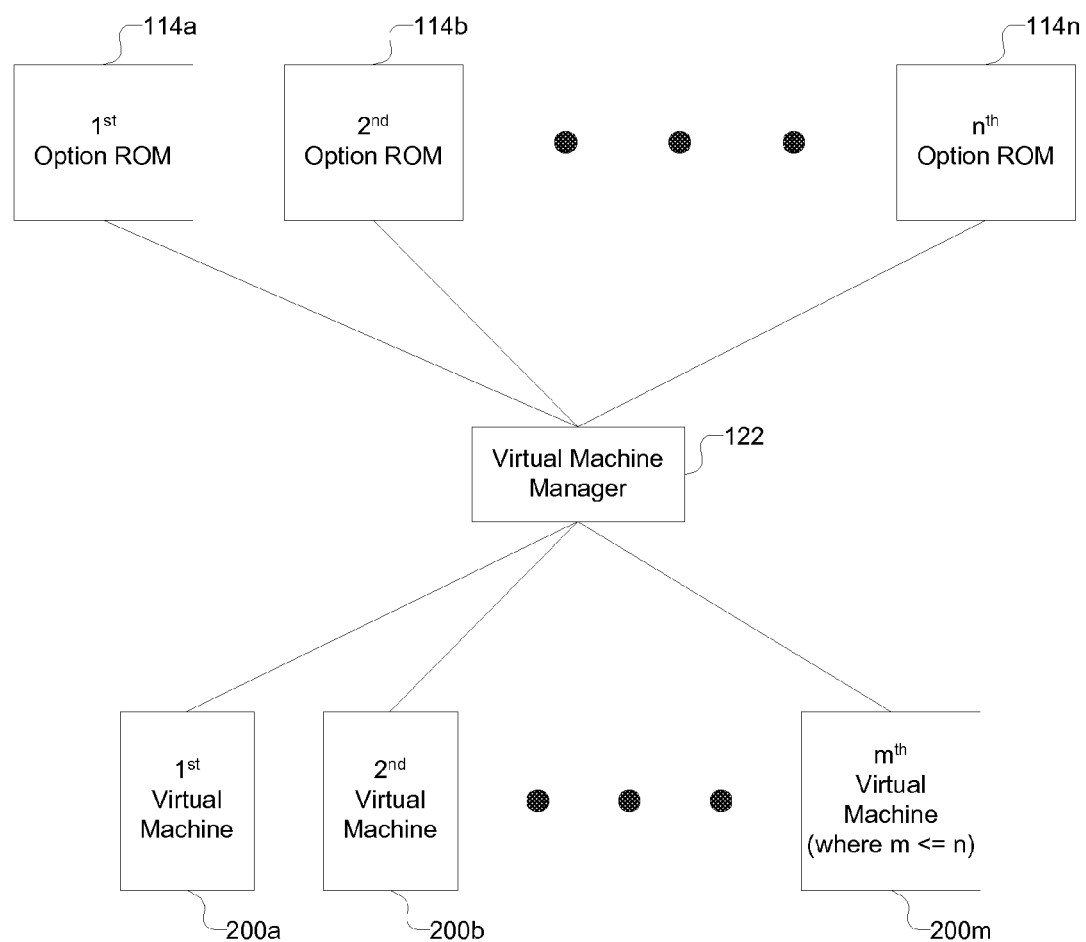
FIG. 2 illustrates a block diagram that indicates how a virtual machine manager maps option ROMs to virtual machines, in accordance with certain embodiments.

FIG. 2 illustrates a block diagram that indicates how the virtual machine manager 122 maps the option ROMs 114a ... 114n to virtual machines 200a, 200b, ... 200m, in accordance with certain embodiments.

Each of the virtual machines 200a ... 200m is generated by the virtual machine manager 122 and one or more option ROMs are mapped to each virtual machine. For example, the $1^{st}$ virtual machine 200a may have the $1^{st}$ option ROM 114a and the $2^{nd}$ option ROM 114b mapped into the $1^{st}$ virtual machine 200a. Since one or more option ROMs are mapped to each virtual machine, the total number of virtual machines generated by the virtual machine manager 122 may be less than the total number of optional ROMs, i.e., m<=n in FIG. 2.

In certain embodiments illustrated in FIG. 2, the virtual machines 200a ... 200m generated by the virtual machine manager 122 are stored and executed in the system memory 110 of the computational platform 102. Each of the virtual machines 200a ... 200m simulate the C segment 120 and the D segment 118. The option ROMs 114a ... 114n are not constrained to be mapped to the 128K space of the C and D segments 118, 120 but can be mapped to the much larger sized system memory 110 that can be up to 4 G bytes in the 32-bit PC architecture.

Figure 3:
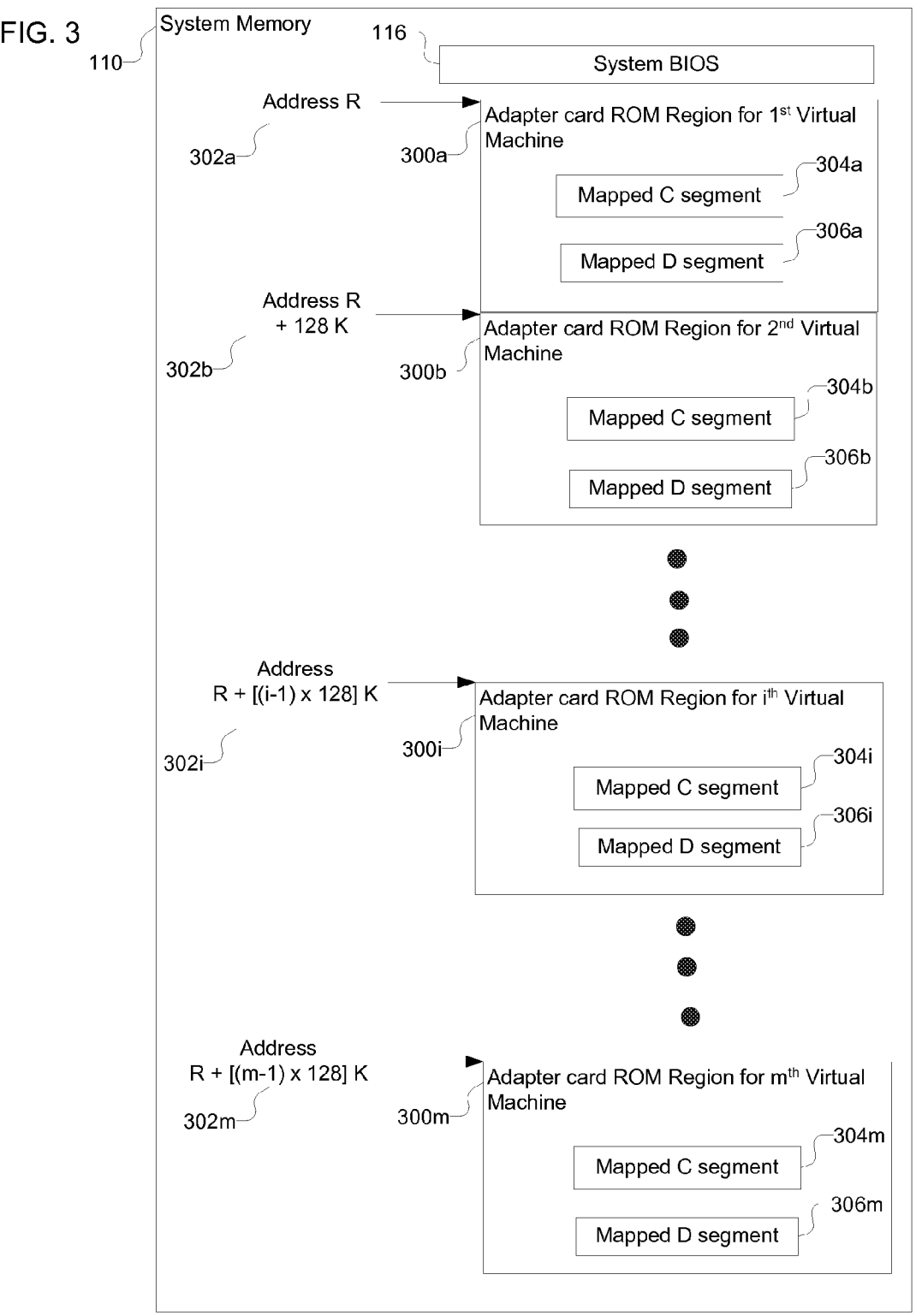
FIG. 3 illustrates a block diagram that indicates first exemplary mappings in the system memory, in accordance with certain embodiments.

FIG. 3 illustrates a block diagram that indicates first exemplary mappings in the system memory 110, in accordance with certain embodiments.

In certain embodiments, the virtual machines 200a ... 200m simulate the C segment 120 and the D segment 118 by reserving space for the simulated C and D segments in the system memory 110. FIG. 3 illustrates adapter card ROM regions 300a, 300b, ..., 300i, ..., 300m reserved in the system memory 110, where the adapter card ROM regions 300a ... 300m correspond to adapter card ROM regions simulated by the plurality of virtual machines 200a ... 200m respectively. For example, adapter card ROM region 300a may be reserved for virtual machine 200a, adapter card ROM region 300b may be reserved for virtual machine 200b, and adapter card ROM region 300m may be reserved for virtual machine 200m. The adapter card ROM regions 300a, 300b, ..., 300i, ..., 300m include mapped C segments (reference numerals 304a, 304b, ..., 304i, ..., 304m) and mapped D segments (reference numerals 306a, 306b, ..., 306i, ..., 306m) as shown in FIG. 3.

In certain embodiments, each of the mapped C segments 304a ... 304m is 64K bytes in size as the C segment 120 is 64 K bytes in size, and each of the mapped D segments 306a ... 306m is 64 K bytes in size as the D segment 118 is 64 K bytes in size. In certain embodiments, if the adapter card ROM region 300a for the $1^{st}$ virtual machine 200a is located at byte address R (reference numeral 302a), then the adapter card ROM region 300b for the $2^{nd}$ virtual machine 200b is located at byte address R+128K (reference numeral 302b), the adapter card region 300i for the $i^{th}$ virtual machine is located at byte address R+[(i−1)×128] K (reference numeral 302i) and the adapter card region 300m for the $m^{th}$ virtual machine 300m is located at byte address R+[(m−1)×128] K (reference numeral 302m).

Certain embodiments illustrated in FIG. 3 indicate how adapter card ROM regions 300a ... 300m are reserved in the system memory 110 by the virtual machines 200a ... 200m for simulating the C segment 120 and the D segment 118.

Figure 4:
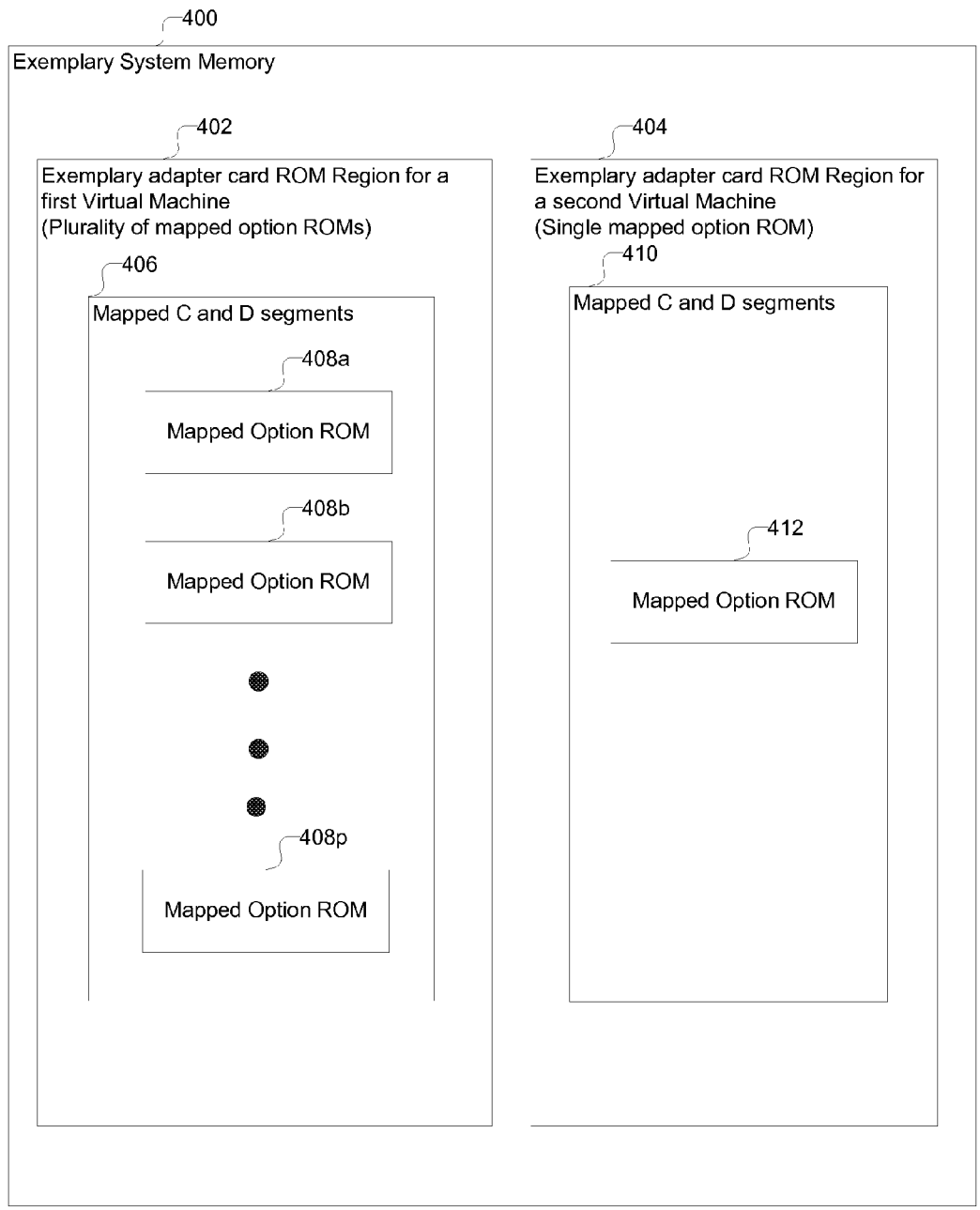
FIG. 4 illustrates a block diagram that indicates second exemplary mappings in the system memory, in accordance with certain embodiments.

FIG. 4 illustrates a block diagram of an exemplary system memory 400, where the block diagram indicates second exemplary mappings in the system memory 200, in accordance with certain embodiments.

The exemplary system memory 400 includes an exemplary adapter card ROM region 402 for a first virtual machine and an exemplary adapter card ROM region 404 for a second virtual machine. The mapped C and D segments 406 of the exemplary adapter card ROM region 402 include a plurality of mapped option ROMs 408a, 408b, ..., 408p. In the exemplary adapter card ROM region 402, option ROMs for more than one device have been mapped by one virtual machine.

In contrast, the mapped C and D segments 410 of the exemplary adapter card ROM region 404 include a single mapped option ROM 412. In the exemplary adapter card ROM region 404, option ROM for a single device has been mapped by one virtual machine.

Therefore, FIG. 4 illustrates certain embodiments in which option ROMs corresponding to one or more bootable devices may be simulated by each of the virtual machines 200a ... 200m.

Figure 5:
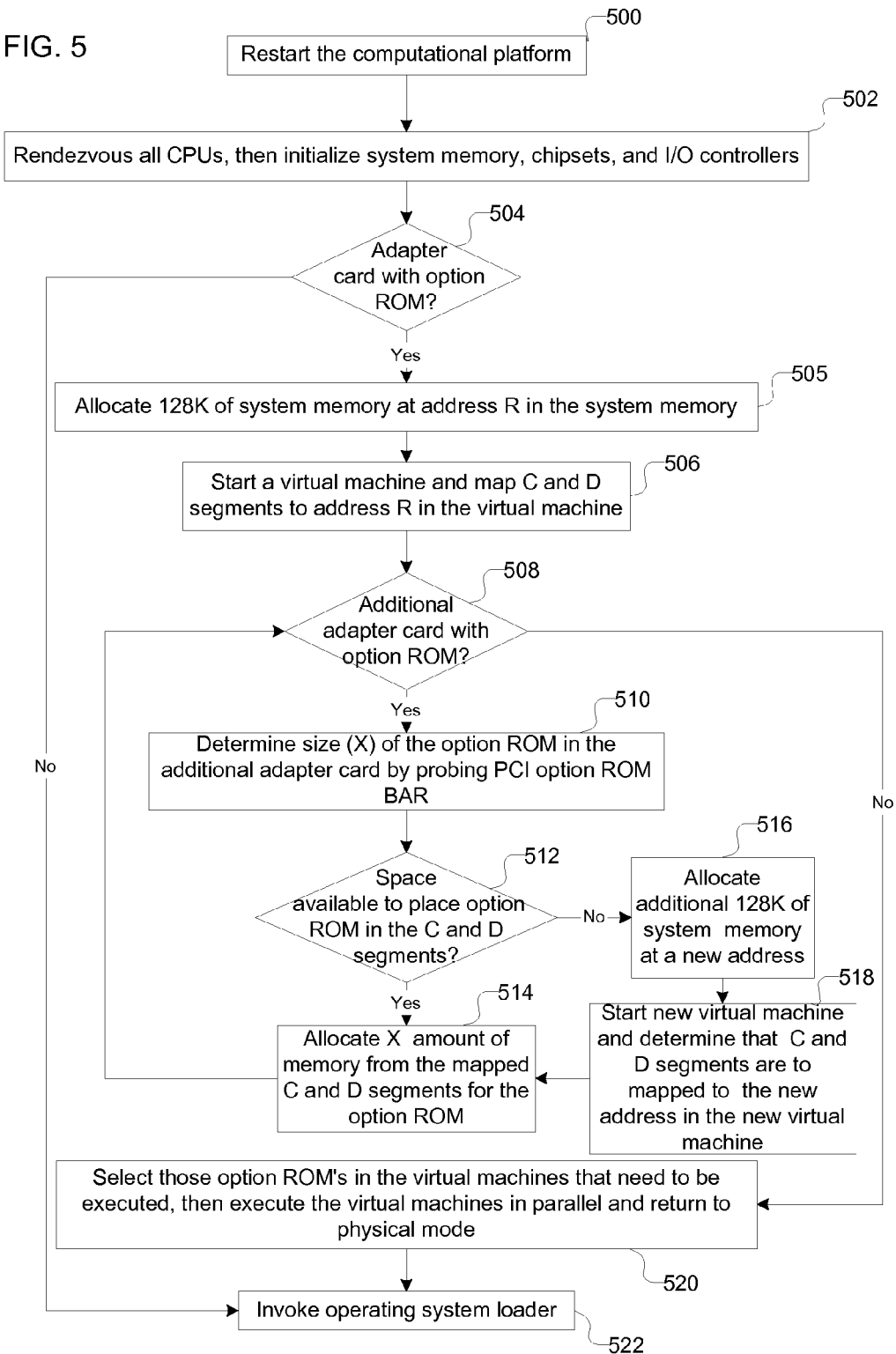
FIG. 5 illustrates first operations for managing option ROMs, in accordance with certain embodiments.

FIG. 5 illustrates first operations for managing the option ROMs 114a ... 114n, in accordance with certain embodiments. Certain of the operations for managing the option ROMs 114a ... 114n may be implemented by the virtual machine manager 122.

Control starts at block 500, where the computational platform 102 is restarted. The restarting of the computational platform 102 may be caused by a hardware boot and may be performed either locally or over a network. Control proceeds to block 502, where rendezvous operations are performed on the CPUs 108 and the system memory 110 is initialized. The chipsets and input/output (I/O) controllers that may be present in the computational platform 102 are also initialized.

The virtual machine manager 122 determines (at block 504) whether an adapter card with option ROM, such as any of the adapter cards 112a ... 112n, is present in the computational platform 102. If so, the virtual machine manager 122 allocates (at block 505) 128K of system memory 110 at address R (reference numeral 302a) in the system memory 110. The virtual machine manager 122 starts (at block 506) a virtual machine, such as the $1^{st}$ virtual machine 200a, and maps the C segment and the D segment to address R 302 in the virtual machine. For example, if the virtual machine started by the virtual machine manager 122 is the $1^{st}$ virtual machine 122, then the adapter card ROM region 300a for the $1^{st}$ virtual machine 122 includes the mapped C segment 304a and the mapped D segment 306a, where the adapter card ROM region 300a is located at byte address R 302a.

The virtual machine manager 122 determines (at block 508) whether an additional adapter card with option ROM is present in the computational platform 102. If so, then the virtual machine manager 122 determines (at block 510) the size of the option ROM in the additional adapter card by probing a Peripheral Component Interconnect (PCI) option ROM Base Address Register (BAR), where the size of the option ROM in the additional adapter card may be determined to be of size X, where X denotes an amount of memory.

Control proceeds to block 512 where the virtual machine manager 122 determines whether there is space available for the virtual machine that was started in block 506 to place the option ROM in the mapped C and D segments. If so, the virtual machine manager 122 allocates (at block 514) X amount of memory from the mapped C and D segments for the option ROM, and returns control to block 508 where a determination is made as to whether an additional adapter card with option ROM is present.

If at block 512, the virtual machine manager 122 determines that enough space is not available to place the option ROM in the mapped C and D segments, then the virtual machine manager 122 allocates (at block 516) an additional 128K of system memory at a new address. For example, in certain embodiments the virtual machine manager 122 may allocate at address R+128K (reference numeral 302b) 128 K bytes of system memory when enough space is not available to place the option ROM in the mapped C and D segments 304a, 306a at address R (reference numeral 302a). The virtual machine manager 122 starts (at block 518) a new virtual machine and determines that the C and D segments should be mapped to the new address allocated for the new virtual machine. For example, in certain embodiments, the virtual machine manager 122 may start a $2^{nd}$ virtual machine 200b and determine that the C and D segments should be mapped to the mapped C and D segments 304b, 306b at address R+128K (reference numeral 302a) of the system memory 110. Control proceeds to block 514 where X amount of memory is allocated from the mapped C and D segments for the option ROM and a determination is made (at block 508) as to whether an additional adapter card with option ROM is present.

If the virtual machine manager 122 determines (at block 508) that no additional adapter card with option ROM is present in the computational platform 102 then the virtual machine manager 122 selects (at block 520) those option ROMs in the virtual machines 200a . . . 200m that need to be executed, and then executes in parallel the virtual machines corresponding to the selected option ROMs, before returning the computational platform 102 to a physical mode of execution. The virtual machine manager 122 invokes (at block 522) the operating system loader.

If the virtual machine manager 122 determines (at block 504) that an adapter card with option ROM is not present in the computational platform 102 then the virtual machine manager 122 invokes (at block 522) the operating system loader.

In certain embodiments illustrated in FIG. 5, the virtual machine manager 122 simulates in parallel the operation of a plurality of option ROMs, even when the aggregate size of the plurality of option ROMs exceeds 128 K bytes. Since the total amount of system memory in the case of the 32-bit PC architecture can be 4 G bytes, a greater number of adapter cards with option ROMs may be included in the computational platform 102 for loading internal and external devices 104, 106 at boot time, in comparison to the number of adapter cards with option ROMs than can be loaded at boot time when no virtual machine manager is used.

Figure 6:
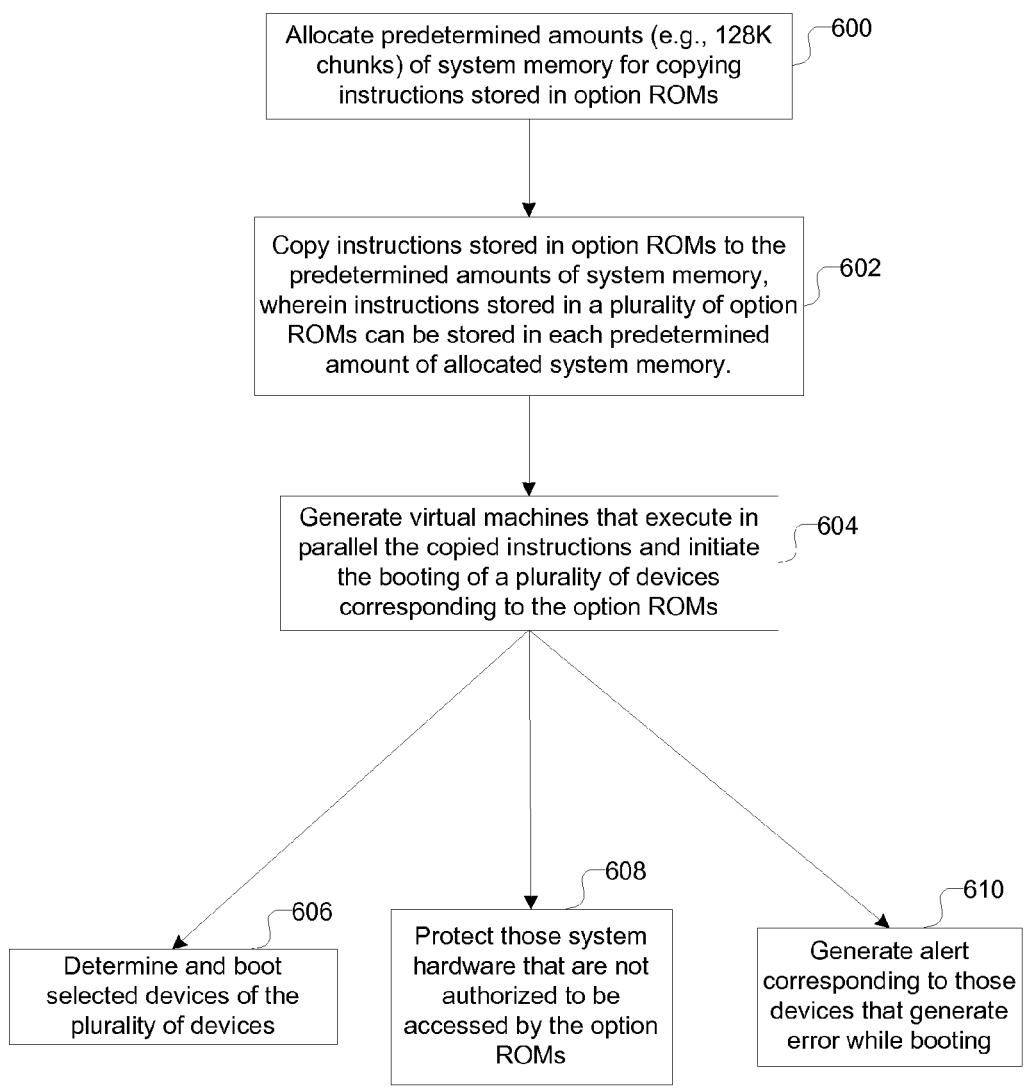
FIG. 6 illustrates second operations for managing option ROMs, in accordance with certain embodiments.

FIG. 6 illustrates second operations for managing option ROMs, in accordance with certain embodiments. The operations illustrated in FIG. 6 may be implemented in the virtual machine manager 122 included in the computational platform 102.

Control starts at block 600, where the virtual machine manager 122 allocates predetermined amounts of system memory for copying instructions stored in option ROMs 114a . . . 114n. In certain embodiments the instructions stored in option ROMs 114a . . . 114n may comprise code. In certain embodiments, the predetermined amounts of system memory may be a plurality of 128 K byte regions of the system memory 110, such as, predetermined amounts of system memory corresponding to the adapter card regions 300a . . . 300m.

The virtual machine manager 122 copies (at block 602) instructions stored in option ROMs 114a . . . 114n to the predetermined amounts of system memory, wherein instructions stored in a plurality of option ROMs 114a . . . 114n can be stored in each predetermined amount of allocated system memory. For example, in certain exemplary embodiments a plurality of mapped options ROMs 408a . . . 408p may be stored in an exemplary adapter card ROM region 402.

The virtual machine manager 122 generates (at block 604) virtual machines 200a . . . 200m that execute in parallel the copied instructions and initiates the booting of a plurality of devices 104, 106 corresponding to the option ROMs 114a . . . 114n. In certain embodiments, the virtual machine manager 122 uses virtualization to create m complete virtual machines 200a . . . 200m, where m is less than or equal to the number of option ROMs that may have to be shadowed in the computational platform 102. Each virtual machine may handle shadowing of the one or more option ROMs assigned to the virtual machine. When all of the virtual machines have completed option ROM executions, the option ROM shadowing information can be collected and placed in the physical hardware for continuation of the booting process prior to the loading of the operating system. This concurrent creation of virtual machines 200a . . . 200m allows for concurrent execution of the option ROMs 114a . . . 114n and mitigates the effects of space limitations by having m instances of the C and D segments 118, 120, one per virtual machine. Dispatching option ROMs in parallel by using the virtualization provided by the virtual machines 200a . . . 200m would allow the system BIOS 116 to reduce the overall time for system boot by allowing the system BIOS 116 to utilize additional system resources, such as multiple processor cores of the CPUs 108 that are normally idle and by allowing the system BIOS 116 to better utilize existing resources by switching from a task that is waiting to a task that requires computing cycles. Virtualization allows the system BIOS 116 to manage multiple virtual threads in execution at the same time, and reduces the overall time for completion of the booting process prior to the loading of the operating system.

From block 604, control proceeds in parallel to blocks 606, 608, and 610. At block 606, the virtual machine manager 122 determines selected devices of the plurality of devices and boots the selected devices. For example, in certain embodiments, the virtual machine manager 122 may determine that only internal devices 104 would be booted prior to the loading of the operating system, and may choose to execute in parallel the virtual machines corresponding to the option ROM of the adapter cards of the internal devices 104. In certain embodiments, if the option ROMs 114a . . . 114n exceed the size of the available segments then the virtual machine manager 122 may allow the user to choose which devices the user wants to boot prior to the loading of the operating system. The user could also allow the virtual machine manager 122 to automatically determine which devices to boot prior to the loading of the operating system.

At block 608, the virtual machine manager 122 may protect those system hardware that are not authorized to be accessed by the option ROMs 114a . . . 114n. If malicious or erroneous code is included in any of option ROMs 114a . . . 114n for accessing system hardware not available to the option ROMs 114a . . . 114n, then the execution of such malicious or erroneous code is prevented by the virtual machine manager 122. For example, in certain situations a legacy option ROM may not be signed or verified beyond a checksum. Thus legacy option ROMs may present a vulnerability to attack which could be considered significant. If an attacker can gain access to a particular adapter vendor's option ROM space then an attacker may gain access to a system before the operating system loads, and the attacker can launch denial of service attacks and potentially impact data integrity. Certain embodiments that manage option ROMs by using the virtual machine manager 122 would allow the system BIOS 116 to protect access to system hardware not associated with the option ROM and still allow a valid option ROM to execute as needed, thus reducing this window of vulnerability during Power on Self Test (POST), where POST includes booting of devices prior to loading of the operating system.

At block 610, the virtual machine manager 122 generates alerts corresponding to those devices that generate error while booting. For example, if an external device, such as an external bootable hard drive, generates an error during booting, then the virtual machine manager 122 generates an alert to indicate that the external bootable hard drive has generated an error while booting. Generating alerts as shown in block 610 may be useful, because in certain situations an option ROM may halt execution of POST. Option ROMs may have to operate in configurations in which it is not always possible to test software defects, and such software defects in option ROMs can cause system errors. Also, if an option ROM discovers an error during execution, the option ROM could simply stop and wait for user intervention. Computational platforms may not always operate with a user present, so a computational platform 102 waiting for user intervention or hung during option ROM execution could be out of service. Certain embodiments would allow the system BIOS 116 the opportunity to isolate each option ROM and if one option ROM does not respond within a predetermined period of time, the system BIOS 116 could send an alert but continue POST, allowing the computational platform 102 to be back in service much sooner than without the use of the virtual machine manager 122. This would potentially allow operating system resident diagnostic and alerting software to handle problems caused by defective option ROMs.

In systems that do not use the virtual machine manager 122, the system BIOS may dispatch and shadow legacy option ROMs to initialize and configure hardware within the system. Although certain embodiments have been described with C and D segments 118, 120 being used for storing option ROMs, certain alternative systems may include up to N option ROMs where N is limited by the size of shadowing space available in C, D, and in certain cases E legacy segments, where the maximum size of the shadowing space available in C, D, and E segments may in aggregate lie between 128 KB and 192 KB. In systems that do not use the virtual machine manager 122, the system BIOS may shadow the option ROMs serially during POST. Although certain option ROMs may decompress themselves and leave a small runtime image to reduce the space requirements, even then the option ROMs have to be executed serially in systems that do not use the virtual machine manager 122. Certain embodiments that use the virtual machine manager 122 may not only avoid the 128 KB to 192 KB upper limit of legacy option ROMs but may also execute the option ROMs in parallel by using the virtual machines 200a . . . 200m.

Certain embodiments may also allow the system BIOS to execute in parallel other independent pieces of system initialization code, further reducing POST time. The reduction of POST time would increase beat rate of systems in the factory, and may have the effect of decreasing the per unit cost of manufacturing and testing of the systems. Reducing POST time may also reduce the time interval between the time when a user turns on a system to the time when the system is ready to respond, and the reduction in the time interval may improve the user experience.

Certain embodiments avoid any need to use PCI 3.0 firmware specification extensions to put option ROMs above 1 M bytes.

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. A "machine readable medium" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art. Furthermore, program logic that includes code may be implemented in hardware, software, firmware or any combination thereof. The described operations of FIGS. 1-7 may be performed by a processor or circuitry, where "circuitry" refers to either hardware or software or a combination thereof. The circuitry for performing the operations of the described embodiments may comprise a hardware device, such as an integrated circuit chip, a PGA, an ASIC, etc. The circuitry may also comprise a processor component, such as an integrated circuit, and code in a computer readable medium, such as memory, wherein the code is executed by the processor to perform the operations of the described embodiments.

Figure 7:
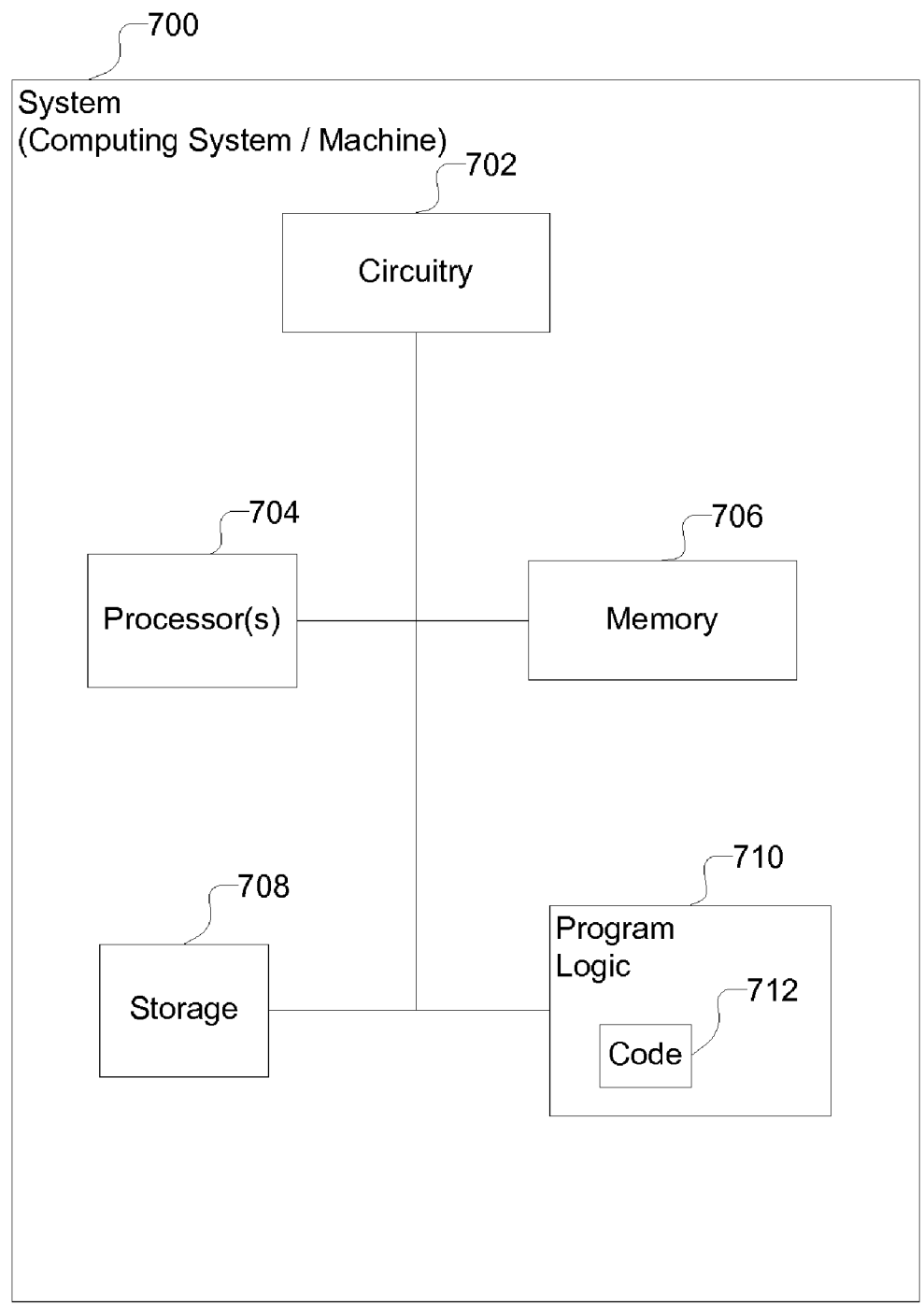
FIG. 7 illustrates a block diagram of a system including certain elements of the computing environment of FIG. 1, in accordance with certain embodiments.

FIG. 7 illustrates a block diagram of a system 700 in which certain embodiments may be implemented. For example, in certain embodiments the system 700 may comprise the computational platform 102. Certain embodiments may be implemented in systems that do not require all the elements illustrated in the block diagram of the system 700. The system 700 may include circuitry 702 coupled to a memory 706, wherein the described operations of FIGS. 5-6 may be implemented by the circuitry 702. In certain embodiments, the system 700 may include a processor 704 and a storage 708, wherein the storage 708 may be associated with program logic 710 including code 712, that may be loaded into the memory 706 and executed by the processor 704. In certain embodiments the program logic 710 including code 712 is implemented in the storage 708. In certain alternative embodiments, the operations performed by program logic 710 including code 712 may be implemented in the circuitry 702. Additionally, the system 700 may also include a video controller. The operations described in FIGS. 5-6 may be performed by the system 700.

Certain embodiments may be implemented in a computer system including a video controller to render information to display on a monitor coupled to the system 700, where the computer system may comprise a desktop, workstation, server, mainframe, laptop, handheld computer, etc. An operating system may be capable of execution by the computer system, and the video controller may render graphics output via interactions with the operating system. Alternatively, some embodiments may be implemented in a computer system that does not include a video controller, such as a switch, router, etc. Also, some embodiments may be implemented in a computer system where the video controller does not have the capability of rendering graphics output but has the capability of rendering text output. Furthermore, in certain embodiments the device may be included in a card coupled to a computer system or may be on a motherboard of a computer system.

Certain embodiments may be implemented in a computer system including a storage controller, such as, a Small Computer System Interface (SCSI), AT Attachment Interface (ATA), Redundant Array of Independent Disk (RAID), etc., controller, that manages access to a non-volatile storage device, such as a magnetic disk drive, tape media, optical disk, etc. Certain alternative embodiments may be implemented in a computer system that does not include a storage controller, such as, certain hubs and switches.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

The data structures and components shown or referred to in FIGS. 1-7 are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:

copying, to a system memory of a computer, instructions stored in a plurality of option ROMs corresponding to a plurality of devices that are coupled to the computer, wherein a system BIOS of the computer is restricted to a predetermined maximum number of bytes to load the plurality of option ROMs generating, by a virtual machine manager executing in the system BIOS, a plurality of virtual machines, wherein the plurality of virtual machines are programs that emulate booting of the plurality of devices by the system BIOS of the computer and executing the plurality of virtual machines in parallel to boot the plurality of devices before any operating system is loaded, wherein the plurality of virtual machines allow more than the predetermined maximum number of bytes to be allocated in the system memory to execute the instructions stored in the plurality of option ROMs.

2. The method of claim 1, further comprising:
determining, by the plurality of virtual machines selected devices from the plurality of devices that are to be booted before any operating system is loaded; and
booting the selected devices.

3. The method of claim 1, further comprising:
determining system hardware that is not authorized to be accessed by an option ROM of the plurality of option ROMs; and
protecting access to the system hardware that is not authorized to be accessed by the option ROM while executing the instructions copied to the system memory.

4. The method of claim 1, further comprising:
initiating booting the plurality of devices from the plurality of virtual machines;
generating an alert corresponding to those devices that generate error while booting; and
completing booting those devices that do not generate error while booting.

5. The method of claim 1, wherein the predetermined maximum number of bytes is 128 K bytes.

6. The method of claim 5, wherein the 128 K bytes are mapped to C and D segments.

7. The method of claim 6, wherein the instructions stored in the plurality of option ROMs exceed 128 K bytes.

8. A system, comprising:
a system memory;
a system BIOS included in the system memory;
a plurality of devices coupled to the system memory; and
a plurality of option ROMs corresponding to the plurality of devices, wherein the system is operable to:
copy, to the system memory, instructions stored in the plurality of option ROMs, wherein the system BIOS of the computer is restricted to a predetermined maximum number of bytes to load the plurality of option ROMs;
generate, by a virtual machine manager executing in the system BIOS, a plurality of virtual machines, wherein the plurality of virtual machines are programs that emulate booting of the plurality of devices by the system BIOS; and
execute the plurality of virtual machines in parallel to boot the plurality of devices before any operating system is loaded, wherein the plurality of virtual machines allow more than the predetermined maximum number of bytes to be allocated in the system memory to execute the instructions stored in the plurality of option ROMs.

9. The system of claim 8, wherein the system is further operable to:
determine, by the plurality of virtual machines, selected devices from the plurality of devices that are to be booted before any operating system is loaded; and
boot the selected devices.

10. The system of claim 8, wherein the system is further operable to:
determine system hardware that is not authorized to be accessed by an option ROM of the plurality of option ROMs; and
protect access to the system hardware that is not authorized to be accessed by the option ROM while executing the instructions copied to the system memory.

11. The system of claim 8, wherein the system is further operable to:
initiate booting the plurality of devices from the plurality of virtual machines;
generate an alert corresponding to those devices that generate error while booting; and
complete booting those devices that do not generate error while booting.

12. The system of claim 8, wherein the predetermined maximum number of bytes is 128 K bytes.

13. The system of claim 12, wherein the 128K bytes are mapped to C and D segments.

14. The system of claim 13, wherein the instructions stored in the plurality of option ROMs exceed 128 K bytes.

15. A machine readable medium having instructions stored therein instructions that when executed cause a computer to:
copy, to a system memory of the computer, instructions stored in a plurality of option ROMs corresponding to a plurality of devices that are coupled to the computer, wherein a system BIOS of the computer is restricted to a predetermined maximum number of bytes to load the plurality of option ROMs;
generating, by a virtual machine manager executing in the system BIOS, a plurality of virtual machines, wherein the plurality of virtual machines are programs that emulate booting of the plurality of devices by the system BIOS of the computer; and
executing the plurality of virtual machines in parallel to boot the plurality of devices before any operating system is loaded, wherein the plurality of virtual machines allow more than the predetermined maximum number of bytes to be allocated in the system memory to execute the instructions stored in the plurality of option ROMs.

16. The machine readable medium of claim 15, wherein the instructions when executed further cause the computer to:
determine, by the plurality of virtual machines, selected devices from the plurality of devices that are to be booted before any operating system is loaded; and
boot the selected devices.

17. The machine readable medium of claim 15, wherein the instructions when executed further cause the computer to:
determine system hardware that is not authorized to be accessed by an option ROM of the plurality of option ROMs; and
protect access to the system hardware that is not authorized to be accessed by the option ROM while executing the instructions copied to the system memory.

18. The machine readable medium of claim 15, wherein the instructions when executed further cause the computer to:
initiate booting the plurality of devices from the plurality of virtual machines;
generate an alert corresponding to those devices that generate error while booting; and
complete booting those devices that do not generate error while booting.

19. The machine readable medium of claim 15, wherein the predetermined maximum number of bytes is 128 K bytes.

20. The machine readable medium of claim 19, wherein the 128 K bytes are mapped to C and D segments.

21. The machine readable medium of claim 20, wherein the instructions stored in the plurality of option ROMs exceed 128 K bytes.

* * * * *